United States Patent
Upreti et al.

(10) Patent No.: US 10,736,332 B2
(45) Date of Patent: Aug. 11, 2020

(54) PHYSICALLY STABLE LIQUEFIED CHEESE COMPOSITION AND PROCESS FOR MAKING IT

(71) Applicant: NESTEC S.A., Vevey (CH)

(72) Inventors: Praveen Upreti, Twinsburg, OH (US); David Wulff, Aurora, OH (US)

(73) Assignee: Societe des Produits Nestle S.A., Vevey (CH)

( * ) Notice: Subject to any disclaimer, the term of this patent is extended or adjusted under 35 U.S.C. 154(b) by 362 days.

(21) Appl. No.: 15/516,289

(22) PCT Filed: Aug. 25, 2015

(86) PCT No.: PCT/EP2015/069388
§ 371 (c)(1),
(2) Date: Mar. 31, 2017

(87) PCT Pub. No.: WO2016/050420
PCT Pub. Date: Apr. 7, 2016

(65) Prior Publication Data
US 2017/0303556 A1 Oct. 26, 2017

Related U.S. Application Data
(60) Provisional application No. 62/059,292, filed on Oct. 3, 2014.

(51) Int. Cl.
*A23C 19/09* (2006.01)
*A23C 19/076* (2006.01)

(52) U.S. Cl.
CPC ........ *A23C 19/0904* (2013.01); *A23C 19/076* (2013.01); *A23V 2002/00* (2013.01)

(58) Field of Classification Search
None
See application file for complete search history.

(56) References Cited

U.S. PATENT DOCUMENTS 3,929,892 A * 12/1975 Hynes .................. A23C 19/076
426/582
5,395,630 A * 3/1995 Gamay .............. A23C 19/0323
426/39
5,676,984 A 10/1997 Bohanan et al.
(Continued)

FOREIGN PATENT DOCUMENTS

| CA | 2 683 298 | * 10/2009 | ............. A23C 9/152 |
| WO | 2008122094 | 10/2008 | |

OTHER PUBLICATIONS

Jana et al. "The effects of homogenization conditions on the textural and baking characteristics of buffalo milk mozzarella cheese" The Australian Journal of Dairy, May 1991, vol. 46, No. 1, pp. 27-30.

*Primary Examiner* — Katherine D Leblanc
(74) *Attorney, Agent, or Firm* — K&L Gates LLP

(57) ABSTRACT

The present invention relates to a physically stable cheese composition comprising 55-75 wt % soft cheese and 25-45 wt % water; wherein the cheese composition has a viscosity from 2000 to 4,500 cP at 10° C., and a pH from 4.0 to 4.8; and wherein particles comprised in the cheese composition have a median particle size distribution of 0.6 to 10 micro-meter, preferably of 0.9 to 7 micro-meter. The invention further pertains to a process for making the cheese composition.

5 Claims, 2 Drawing Sheets

(56) References Cited

U.S. PATENT DOCUMENTS

| | | | | |
|---|---|---|---|---|
| 5,750,177 A | * | 5/1998 | Yee | A23C 19/0285 |
| | | | | 426/520 |
| 6,001,400 A | * | 12/1999 | Burger | A21D 8/02 |
| | | | | 426/143 |
| 7,651,715 B2 | * | 1/2010 | Merrill | A23C 19/0917 |
| | | | | 426/582 |
| 2005/0084565 A1 | * | 4/2005 | Gutknecht | A23C 9/1307 |
| | | | | 426/36 |

* cited by examiner

PHYSICALLY STABLE LIQUEFIED CHEESE COMPOSITION AND PROCESS FOR MAKING IT

CROSS REFERENCE TO RELATED APPLICATIONS

The present application is a National Stage of International Application No. PCT/EP2015/069388, filed on Aug. 25, 2015, which claims priority to U.S. Provisional Patent Application No. 62/059,292, filed on Oct. 3, 2014, the entire contents of which are being incorporated herein by reference.

The present invention relates to the processing of cheese and in particular to a process for liquefying a soft cheese to produce a fluid, physically stable high viscosity cheese product for industrial application. A further aspect of the present invention is the resulting cheese composition.

Cheese and processed cheese products are used industrially in the preparation of a large variety of different food products. Particularly, cheese is used in many of those food products as a topping to improve taste, indulgence and the appearance of the food product. Some prominent examples are pizza products as well as pasta with cheese products such as macaroni and cheese. Thereby, traditionally, blocks of cheese are shredded to small cheese snips or cut into pieces and those snips or pieces are then used to top the respective food products.

Alternatively, processed cheese has already been formed into smaller pieces or slices which can be used for example directly for topping such food products. The methods of processing cheese usually include the incorporation of artificial additives into the cheese mass. However, modern consumers shuns from food products and food ingredients having additives from unnatural origin. Modern health-conscious consumers demand today a higher level of food product quality than ever, and seek to consume foods that are free from artificial, non-natural additives.

Furthermore, the use of solid cheese pieces or snips are not very easy to handle in an industrial factory setting as they produce a lot of waste, are difficult to transport and portion, and generally produce quite some mess around the cheese handling installations. The efficiency of modern high throughput processing and packaging machinery is therefore facilitated by using cheese products that are substantially fluid and can be pumped, poured and portioned as a fluid or paste directly onto the appropriate food products.

For example, WO 2008/122094 A1 discloses processes for liquefying cheese to produce a low viscosity product with enhanced such handling properties. Particularly, the document discloses that hard cheeses, such as cheddar cheese, and some soft cheeses, such as cottage and cream cheese, can be liquefied with water if run through specific heating step processes. No artificial substances have to be added to the cheese product. However, there is still an opportunity for improvement of the liquefied cheese product as to texture properties and stability of the composition over time.

Therefore, the object of the present invention is to improve the state of the art and to provide an improved or at least alternative solution to overcome at least some of the inconveniences described above. Particularly, the object of the present invention is to improve the texture properties and the stability of the liquefied cheese composition of the prior art.

The object of the present invention is achieved by the subject matter of the independent claims. The dependent claims further develop the idea of the present invention.

Accordingly, the present invention provides in a first aspect a physically stable cheese composition comprising:
   55-75 wt % soft cheese, and
   25-45 wt % water;
   wherein the cheese composition has a viscosity from 2,000 to 4,500 cP at 10° C., and a pH from 4.0 to 4.8; and wherein particles comprised in the cheese composition have a median particle size distribution of 0.6 to 10 micro-meter, preferably of 0.9 to 7 micro-meter.

A second aspect of the present invention relates to a process for making a physically stable cheese composition comprising the steps of:
   a) mixing 55-75 wt % soft cheese with 25-45 wt % water at room temperature with a blender;
   b) adjusting the pH of the soft cheese-water mixture to a pH from 4.0-4.8;
   c) heating the soft cheese-water mixture under continuous mixing to a temperature of 50-65° C.;
   d) homogenizing the heated soft cheese-water mixture under pressure at 30-500 bar at a temperature of 50-65° C.;
   e) cooling the heat treated soft cheese-water mixture to a temperature of 4-20° C.

A third aspect of the invention relates to a food product made with use of the cheese composition according to the present invention.

While experiencing with making liquefied soft cheese products, the inventors have surprisingly found that when liquefying soft cheese with water remarkable improvements of the liquefied cheese product can be obtained when adjusting the pH of the cheese-water mixture to a value between 4.0 and 4.8, and when homogenizing the cheese-water mixture under pressure at a temperature from 50° C. to not exceeding 65° C. Particularly, the inventors made the observation that the liquefied cheese product obtained by the new process has a significantly higher viscosity than same corresponding products made according to the prior art process which have a heating step at 85° C.; that the median size of the milk-cheese particles was not increased after the process and stayed around 0.6 to 10 μm, while a heating process at 85° C. or above resulted in particles of sizes above 10 μm to about 30 μm, or even larger; and that the product texture stability increased significantly with using the new process in comparison to either not using the homogenization step of the present process, or by mixing the product at 85° C. as taught by the prior art. Evidence for this is provided in the Example section below. Furthermore, it is believed by the inventors that the pH value of the cheese-water mixture is critical for the water holding capacity of the cheese mass. Usually, the water holding capacity of milk proteins around their iso-electric point of pH 4.6 is not extraordinary and one would not expect a good water holding capacity of a soft cheese water mixture at those pH values. However, it was surprisingly observed by the inventors that when adjusting the pH of the liquefied soft cheese mixture at pH values from 4.0 to about 4.8, homogenization under pressure actually resulted in an increased water holding capacity of the mixture. In fact, the higher the homogenization pressure was applied, the better the water capacity, i.e. the lower the instability index, was. However, this improved water holding stability was only evident when homogenization under pressure was performed in a temperature range from 50° C. to about 65° C. Above that temperature range, e.g. at 85° C., the water holding capacity clearly diminished and the instability index values were much higher, in fact as it would have been expected in regard to the iso-electric point of the milk proteins. With wishing to be not bound by theory, the inventors believe that this phenomenon is actually due to the effect of the preservation of the small milk-cheese particle sizes which do not aggregate into larger particles as observed at higher temperature treatments.

Consequently, the advantage of the new process is that the resulting liquefied soft cheese product is smoother and firmer in texture, which allows for example an improved industrial application as well as an improved presentation of the cheese on a final food product, such as e.g. a pizza topped with said soft cheese product. Furthermore, the liquefied soft cheese is more stable and shows less spontaneous syneresis over time.

DETAILED DESCRIPTION OF THE INVENTION

Figure 1:
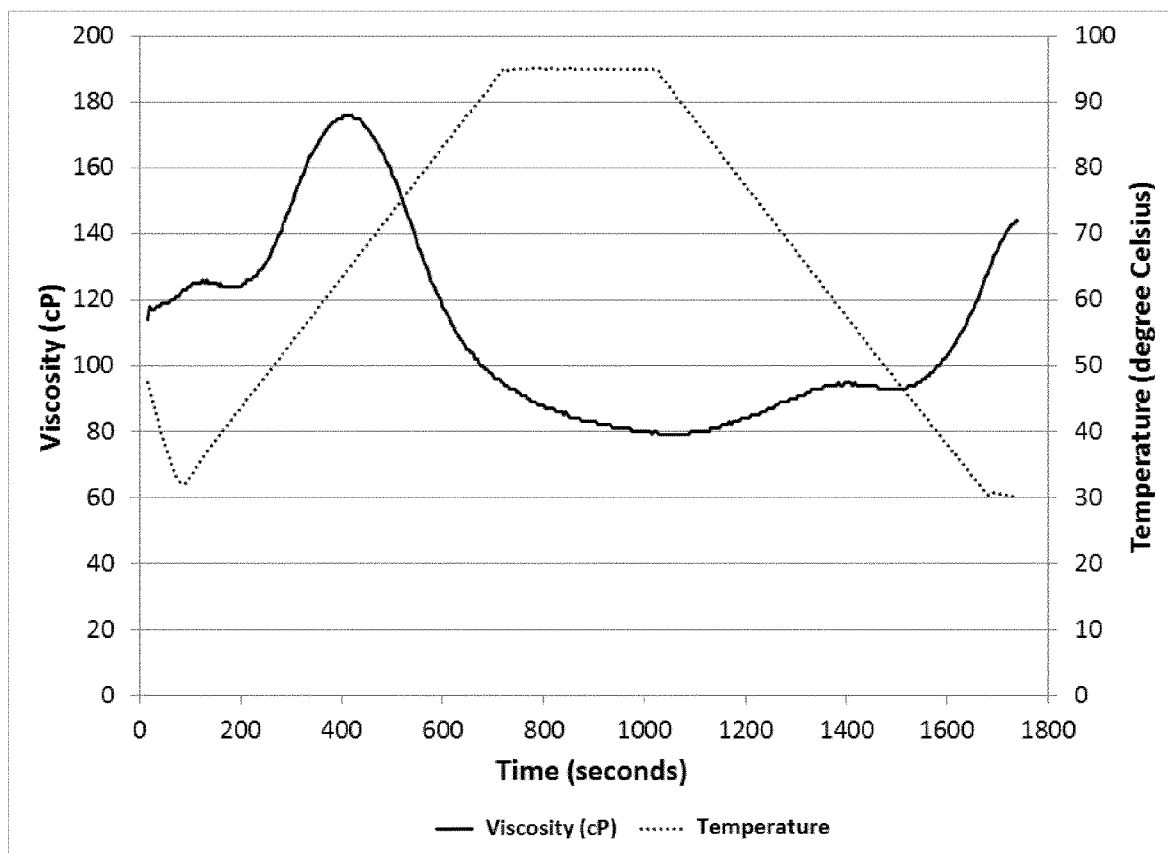
FIG. 1: Effect of temperature on viscosity of liquefied cheese composition.

The present invention pertains to a physically stable cheese composition comprising:
55-75 wt % soft cheese, and
25-45 wt % water;
wherein the cheese composition has a viscosity from 2,000 to 4,500 cP at 10° C., and a pH from 4.0 to 4.8; and wherein particles comprised in the cheese composition have a median particle size distribution of 0.6 to 10 micro-meter, preferably of 0.9 to 7 micro-meter.

"Physically stable" as of the present invention means that the composition has a homogeneous aspect and does not show phase separation at room temperature at least not over a period of 2 weeks, preferably not over a period of at least 4 weeks or longer.

"Soft Cheese" of the present invention relates to any type of cheese that is made and ripened in a relatively short time and has a soft, creamy or almost runny texture.

"Particles" of the present invention are milk-based cheese particles originating from the soft cheese used for making the composition of the present invention and remaining in that composition after the blending and dissolution of the cheese material in the water.

A "median particle size" is the size of the particle separating the higher half of the sample particle population from the lower half.

Preferably, the cheese composition of the present invention has a viscosity from 2,400 to 4,300 cP at 10° C. And preferably, the cheese composition of the present invention has a pH from 4.4 to 4.6. It has been found by the inventors that these value ranges are the optimal ranges for achieving a smooth, firm liquefied soft cheese product which does show minimal syneresis over time and does not give a gritty sensation on the tongue when consumed.

In preferred embodiments, the cheese composition of the present invention comprises a soft cheese which is selected from the group consisting of goat cheese, blue cheese, fresh cheese, Camembert cheese, Brie cheese, cottage cheese, cream cheese, feta cheese, ricotta cheese and mozzarella cheese, or a combination thereof. The blue cheese includes preferably Gorgonzola, Roquefort and le bleu d'Auvergne.

A most preferred embodiment is where the soft cheese is a goat cheese or a Gorgonzola cheese.

A further embodiment of the present invention pertains to a cheese composition, wherein the soft cheese is a combination of at least two different cheeses. Preferably, one of those at least two different cheeses is a goat cheese. Combining two or more different cheeses into one single cheese composition has the advantage that it allows to create completely new cheese flavor profiles and taste experiences for consumers. It allows to balance out e.g. a pronounced single strong cheese flavor in the composition and/or to combine different flavors into one concerted single taste experience.

Preferably, the cheese composition of the present invention has a total solids composition of from 25-42%, preferably from 27-32%.

In a preferred embodiment, the cheese composition of the present invention further comprises herbs and/or spices. This relates to an incorporation of herbs and/or spices directly into the liquefied cheese composition even before its application e.g. onto a food product. Advantageously then herbs and/or spices do not need to be applied separately onto such a food product, which would result in an additional production step, increasing complexity and costs of production. Furthermore, dosing of such herbs and/or spices would be much easier and more consistent for an industrial application. And still further, as the herbs and/or spices would not need to be applied anymore individually e.g. on a production line, the dust level generated by such an application would be drastically reduced.

Preferably, the cheese composition of the present invention does not comprise an added emulsifier, stabilizer and/or thickener. Preferably, the cheese composition of the present invention does not comprise an added non-milk based emulsifier, stabilizer and/or thickener, wherein for example such emulsifier, stabilizer and/or thickener is selected from the group consisting of melting salts, xanthan gum, gum Arabic, guar gum, locust bean gum, cellulose, alginate, pectin, agar, carrageenan, starch, lecithin, mono- and diglycerides of fatty acids, esters of fatty acids, sorbitol, glycerol, polysorbate, konjac, cassia gum and gelatin, or a combination thereof. Modern consumers do not like to have food ingredients with a lot of artificial, non-natural additives. Hence, advantageously, the present embodiment relates to an all-natural cheese composition which is presently much preferred by modern consumers, conscious of health and wishing to reduce artificial additives.

Another aspect of the present invention relates to a process for making a physically stable cheese composition comprising the steps of:
a) mixing 55-75 wt % soft cheese with 25-45 wt % water at room temperature with a blender;
b) adjusting the pH of the soft cheese-water mixture to a pH from 4.0-4.8;
c) heating the soft cheese-water mixture under continuous mixing to a temperature of 50-65° C.;
d) homogenizing the heated soft cheese-water mixture under pressure at 30-500 bar at a temperature of 50-65° C.;
e) cooling the heat treated soft cheese-water mixture to a temperature of 4-20° C.

Preferably, the heating of the soft cheese-water mixture in step c) and d) is to a temperature of 50-60° C., preferably to a temperature of 50-55° C. It has been found by the inventors that this value range is the optimal range for achieving a smooth, firm liquefied soft cheese product which does show minimal syneresis over time and does not give a gritty sensation on the tongue when consumed.

A further preferred embodiment is that the process of the present invention does not comprise a step of adding an emulsifier, a stabilizer and/or a binder. Preferably, the process of the present invention does not comprise a step of adding a non-milk based emulsifier, stabilizer and/or binder selected for example from the group consisting of xanthan gum, gum Arabic, guar gum, locust bean gum, carboxymethyl cellulose, alginate, pectin, agar, carrageenan, gelatin, native starches, modified starches, lecithin, mono- and diglycerides of fatty acids, esters of fatty acids, sorbitol, glycerol, polysorbate, konjac, cassia gum or a combination thereof. Modern consumers do not like to have food ingredients with a lot of artificial, non-natural additives. Hence, advantageously, the present embodiment relates to a process for producing an all-natural cheese composition which is presently much preferred by modern consumers, conscious of health and wishing to reduce artificial additives.

A still further embodiment is the process according to the present invention, comprising a step of adding herbs and/or spices. This allows incorporating herbs and/or spices directly into the cheese composition as part of the production process. A correct dosing of such herbs and/or spices is much easier as they are then not anymore in powdered form and can be dosed in usually much larger quantity batches. Furthermore, complexity and costs for applying herbs and/or spices onto a food product can be reduced considerably.

An even still further embodiment is the process according to the present invention, wherein the process does not comprise a step of heating the cheese composition to a temperature above 65° C. Preferably the process does not comprise a step of heating the cheese composition to a temperature above 75° C. It has been observed by the inventors that when heating the cheese composition of the present invention to a temperature above 65° C., and particularly above 75° C., the structure and texture of the achieved products starts to deteriorate. Particularly, the size of the cheese-milk particles in the cheese composition starts to increase significantly above a median size of 10 micrometers resulting in perceived grittiness upon consumption by a consumer; and at the same time viscosity of the cheese composition is lost.

A still further aspect of the present invention pertains to a food product made with use of the disclosed liquefied cheese composition. Preferably, the food product of the present invention is a pizza, a hot-pocket sandwich or a prepared dish, topped or containing the disclosed liquefied cheese composition.

Those skilled in the art will understand that they can freely combine all features of the present invention disclosed herein. In particular, features described for the product of the present invention may be combined with the process of the present invention and vice versa. Further, features described for different embodiments of the present invention may be combined.

Further advantages and features of the present invention are apparent from the figures and examples.

EXAMPLE 1

Effect of Temperature to the Viscosity of the Liquefied Soft Cheese Composition

A 30-g mixture of soft goat cheese and water was prepared by mixing cheese and water in the ratio of 60:40 (w/w). The mixture was then heated in a Rapid-Visco Analyzer (Perten Instruments North America, 6444 S. 6th St., Springfield, Ill. 62712), while continuously mixing at 160 rpm. An increase in viscosity was observed, with highest rate of increase at ~50° C. and a peak viscosity at around 65° C. (FIG. 1). This was an unexpected result considering that higher temperatures should promote hydrophobic interactions and thereby leading to lower viscosity in such shear-thinning systems. Simultaneously, the increase in viscosity might not be significant and sustainable under the high-shear conditions that could be anticipated during transporting and dispensing such cheese preparations. Hence, with further research conducted (as described in the following examples), it was concluded that heat treatment only could not produce cheese:water preparation with a high viscosity and homogenization was critical for the high viscosity.

EXAMPLE 2

Effect of pH to the Viscosity of the Liquefied Soft Cheese Composition

Three Goat-cheeses, with similar proximate composition (i.e. fat, moisture, protein), were obtained. However, the 3 cheeses had different pH: 5.2, 4.4 and 4.2. The cheeses were blended with water in the ratio of 70:30 (w/w) to give a final cheese preparation with 28% Total Solids. The cheeses with lower pH showed higher consistency (indicator of viscosity) than a cheese with higher pH, i.e. >4.8 (Table 1). The consistencies are measured using Bostwick consistometer, because it is a preferred choice for measuring consistency and flow rate in a variety of viscous material such as e.g. liquid cheese.

TABLE 1

Comparison of consistencies of cheese:water preparations using cheeses with different pH

| Treatment (no homogenization) | pH of mixture | Bostwick (cm in 30 s) |
|---|---|---|
| Goat cheese#1 (cheese:water 70/30) | 5.16 | 23 at 5° C. (equivalent to 160 cP measured in another experiment) |
| Goat cheese#2 (cheese:water 70/30) | 4.3 | 6.5 at 28° C. |
| Goat cheese#3 (cheese:water 70/30) | 4.1 | <0.5 at 5° C. |

The Bostwick consistometer is a long trough with 0.5 cm graduations along the bottom. The trough is separated near one end by a spring loaded gate. This forms a chamber where the sample is loaded. To perform a test, first a sample is loaded, then the gate is opened and a timer is started. At a predetermined time the position of the sample in the trough is recorded. Standards and operating procedures are established based on the individual characteristics of the products and are used for assuring quality on daily basis. For instance, a value of <4 cm in 30 seconds with a samples temperature of <20° C. may be suitable for assuring proper consistency for dispensing on a flat surface.

EXAMPLE 3

Impact of Homogenization and pH Adjustment to Liquefied Soft Cheese Composition

Goat cheese #1 from previous Example 2 was mixed with water in the ratio of 60:40 (w/w), heated to 50° C., and homogenized at 500 bar. The pH of cheese preparation (with and without homogenization) was then adjusted using a food-grade acid. A significant increase of texture consistency was observed, when the pH was adjusted for a homogenized vs. not homogenized sample (Table 2).

TABLE 2

Comparison of consistencies of cheese:water preparations that were homogenized and later adjusted for pH

| Treatment | pH | Bostwick (cm in 30 s) |
|---|---|---|
| Goat cheese (60:40 cheese:water) Homogenized at 500 bar | 5.21 | 23 at 5° C. |
| Goat cheese (60:40 cheese:water) Homogenized at 500 bar; pH-adjusted | 4.5 | 4 at 13.7° C. |
| Goat cheese (60:40 cheese:water) Not Homogenized; pH-adjusted | 4.54 | No increase in visc |

Figure 2:
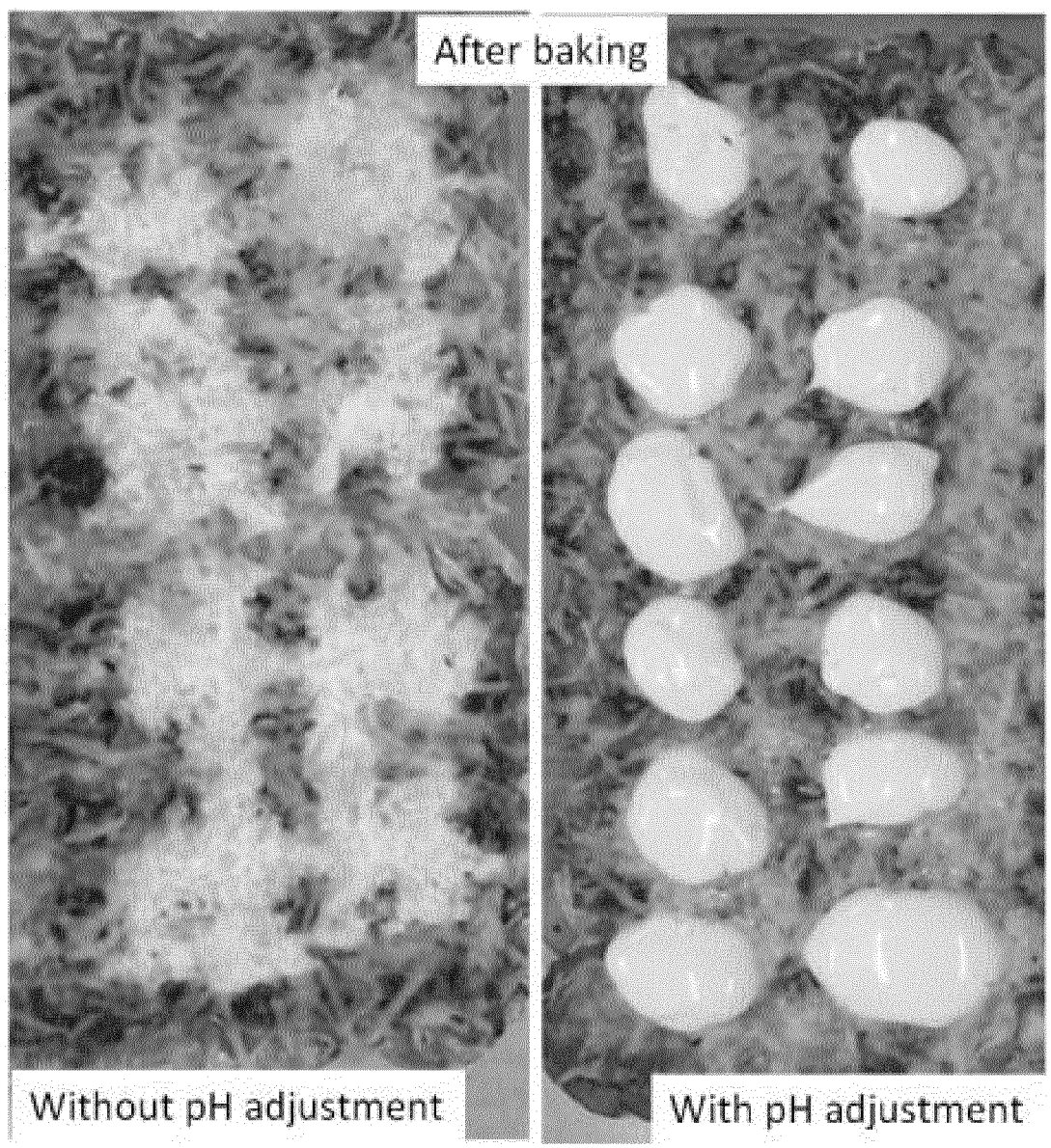
FIG. 2: Product samples as topping on a pizza after baking: sample without and with pH adjustment

FIG. 2 shows the samples after baking on a food product. It is apparent therefrom that the cheese composition with the adjusted lower pH had a much better product consistency, even after a baking step, than the sample without pH adjustment.

EXAMPLE 4

Effect of Homogenization Pressure on Quality of Cheese Preparation

Cheese with pH of 4.0 and a total solids content of 42.1% was used for these experiments. Cheese and water were blended in the ratio of 70:30 (w/w) to target 27% solids in final product. A homogenizer at a throughput of 20.4 Kg/min was used. Cheese preparation was heated to 50° C. before homogenization. A proper blending, without any cheese lumps, was ensured and the pH of cheese preparation was 4.0.

Following are the details for the analytical tests that were used to measure the quality of liquefied cheese preparation.

Instability index using Lumifuge. It is a normalized separation index that goes from 1 to zero (Zero no separation; 1 complete separation. A higher value indicates higher physical instability.

Viscosity using Brookfield rheometer at different strains. The value reported is for strain of 133 s$^{-1}$ at 10° C. These values could not be directly compared to the values reported in the previous trial report. The visual examination of samples indicated a significantly higher viscosity of samples in this study vs. the previously observed viscosities.

Particle size using Malvern particle size analyzer (SOP for non-spherical shape). Data reported is the median of particle size distribution.

At a low pH of 4.0, it is expected that cheeses will not be able to hold extra water added to make the preparation. In addition, homogenization, which is a significantly high shear force should increase the syneresis and decrease water holding capacity. However, surprisingly, this was not the case in our experiments, where homogenization of cheeses with pH as low as 4.0 led to increase in water holding capacity (as apparent from the Instability index values). Even further, the higher homogenization pressures led to increased stability (i.e. higher water holding). This is apparent from the data in the following table 3.

TABLE 3

Comparison of properties of liquefied cheeses under different homogenization pressures

| Homogenization treatment | Instability index | Particle size (μ) | Viscosity (cP) at 133 s$^{-1}$ at 10° C. | Sensory evaluation |
|---|---|---|---|---|
| No homogenization | 0.40 | 4.4 | 1731 | Gritty, no syneresis, firm |
| 35 bar-1$^{st}$ stage; 3.5 bar-2$^{nd}$ stage | 0.35 | 2.9 | 4153 | Smooth, firm, no syneresis |
| 100 bar-1$^{st}$ stage; 10 bar-2$^{nd}$ stage | 0.24 | 2.6 | 3418 | Smooth, creamy flavor, firm, no syneresis |
| 200 bar-1$^{st}$ stage; 20 bar-2$^{nd}$ stage | 0.04 | 0.9 | 3291 | Smooth, creamy flavor, firm, no syneresis |

EXAMPLE 5

Heating to Higher Temperatures and/or Higher Heat Treatment was Detrimental to Physical Stability of the Cheese Preparations The Instability index was higher if the stabilized cheese:water preparation was heated to 85° C. Heating to higher temperatures decreased stability (i.e. higher instability index) and increased particle size, in each set of homogenization pressures, as demonstrated in the tables 4-6.

TABLE 4

Comparison of properties of liquefied cheeses homogenized at 35 bar-1$^{st}$ stage; 3.5 bar-2$^{nd}$ stage and heat treated to 85° C. for different periods of time

| Heat treatment | Instability index | Particle size (μ) | Viscosity (cP) at 133 s$^{-1}$ at 10° C. |
|---|---|---|---|
| No heat treatment | 0.35 | 2.9 | 4153 |
| 85° C. for 5 min | 0.46 | 28.8 | 1036 |
| 85° C. for 15 min | 0.51 | 92.4 | 1196 |
| 85° C. for 30 min | 0.44 | 11.2 | 1511 |

TABLE 5

Comparison of properties of liquefied cheeses homogenized at 100 bar-1$^{st}$ stage; 10 bar-2$^{nd}$ stage and heat treated to 85° C. for different periods of time

| Heat treatment | Instability index | Particle size (μ) | Viscosity (cP) at 133 s$^{-1}$ at 10° C. |
|---|---|---|---|
| No heat treatment | 0.24 | 2.6 | 3418 |
| 85° C. for 5 min | 0.48 | 17.1 | 2017 |
| 85° C. for 15 min | 0.48 | 16.3 | 1539 |
| 85° C. for 30 min | 0.41 | 10.1 | 1840 |

TABLE 6

Comparison of properties of liquefied cheeses homogenized at 200 bar-1$^{st}$ stage; 20 bar-2$^{nd}$ stage and heat treated to 85° C. for different periods of time

| Heat treatment | Instability index | Particle size (μ) | Viscosity (cP) at 133 s$^{-1}$ at 10° C. |
|---|---|---|---|
| No heat treatment | 0.04 | 0.9 | 3291 |
| 85° C. for 5 min | 0.33 | 10.2 | 2036 |
| 85° C. for 30 min | 0.24 | 9.8 | 2437 |

EXAMPLE 6

Consistency of Liquefied Cheese Samples at Higher Homogenization Pressures

Similar experiments as described in Example 4 were carried out with a soft cheese to water ratio of 60/40 and applying higher homogenization pressures of 300 and 400 bar. The results are shown in Table 7 and confirm the earlier described results.

TABLE 7

Comparison of consistency of liquefied cheeses at different homogenization pressure

| Treatment | pH | Bostwick (cm in 30 s) |
|---|---|---|
| 60/40, 300 bar | 5.66 | 17 at 11 C. |
| 60/40, 400 bar | 5.66 | 13 at 9.5 C. |

The invention claimed is:

1. A process for making a physically stable cheese composition, the process comprising:
   a) mixing 55-75 wt% soft cheese with 25-45 wt% water at room temperature with a blender to obtain a soft cheese-water mixture;
   b) adjusting the soft cheese-water mixture to a pH from 4.0-4.8;
   c) heating the soft cheese-water mixture under continuous mixing to a temperature of 50-65° C.;
   d) homogenizing the heated soft cheese-water mixture under pressure at 30-500 bar at a temperature of 50-65° C.; and
   e) cooling the heat treated soft cheese-water mixture to a temperature of 4-20° C., wherein the cheese composition does not contain gelatin and does not contain carrageenan,
   wherein the process does not comprise a step of heating the cheese composition to a temperature above 65° C.

2. The process according to claim 1, wherein the heating of the soft cheese-water mixture in steps c) and d) is to a temperature of 50-60° C.

3. The process according to claim 1, wherein the process does not comprise a step of adding an emulsifier, a stabilizer and/or a binder.

4. The process according to claim 1, further comprising a step of adding herbs and/or spices.

5. The process according to claim 1, wherein the heating of the soft cheese-water mixture under continuous mixing in step c) is to a temperature of 50-55° C.; and the homogenizing of the heated soft cheese-water mixture under pressure at 30-500 bar in step d) is at a temperature of 50-55° C.

* * * * *